(12) United States Patent
Lutz

(10) Patent No.: US 12,501,854 B2
(45) Date of Patent: Dec. 23, 2025

(54) WEAR PROTECTION DEVICE FOR MOWING DISCS FOR ROTARY MOWERS

(71) Applicant: Gebrüder Busatis Gesellschaft m.b.H., Purgstall an der Erlauf (AT)

(72) Inventor: Wolfgang Lutz, Wieselburg (AT)

(73) Assignee: Gebrüder Busatis Gesellschaft m.b.H., PURGSTALL an der Erlauf (AT)

( * ) Notice: Subject to any disclaimer, the term of this patent is extended or adjusted under 35 U.S.C. 154(b) by 803 days.

(21) Appl. No.: 17/846,491

(22) Filed: Jun. 22, 2022

(65) Prior Publication Data

US 2022/0408637 A1    Dec. 29, 2022

(30) Foreign Application Priority Data

Jun. 24, 2021   (AT) .............................. A 50517/2021

(51) Int. Cl.
*A01D 34/73* (2006.01)
*A01D 101/00* (2006.01)

(52) U.S. Cl.
CPC ........ *A01D 34/733* (2013.01); *A01D 2101/00* (2013.01)

(58) Field of Classification Search
CPC .............. A01D 34/733; A01D 2101/00; A01D 34/736; A01D 34/664; A01D 34/73; A01D 34/81
See application file for complete search history.

(56) References Cited

U.S. PATENT DOCUMENTS

| | | | |
|---|---|---|---|
| 4,531,349 A * | 7/1985 | Ehrhart ................... | A01D 34/73 56/13.6 |
| 4,567,716 A * | 2/1986 | Makofka ................ | A01D 34/73 56/13.6 |
| 4,693,062 A | 9/1987 | van der Lely et al. | |
| 6,158,201 A | 12/2000 | Pruitt et al. | |
| 2004/0177484 A1* | 9/2004 | Thompson ........... | A01D 34/736 29/402.03 |
| 2010/0205925 A1* | 8/2010 | Thompson ........... | A01D 34/733 56/255 |
| 2013/0247530 A1* | 9/2013 | Heinrich .............. | A01D 34/733 56/295 |
| 2014/0126952 A1* | 5/2014 | Fay, II ................. | A01D 34/736 56/255 |

(Continued)

FOREIGN PATENT DOCUMENTS

| | | |
|---|---|---|
| DE | 6602812 U | 6/1969 |
| DE | 1930142 A1 | 7/1970 |

(Continued)

OTHER PUBLICATIONS

EP Office Action dated Feb. 6, 2025 of Application No. 22 179 885.3.

(Continued)

*Primary Examiner* — Arpad Fabian-Kovacs
(74) *Attorney, Agent, or Firm* — Gordon & Jacobson, P.C.

(57) ABSTRACT

A mowing disc for rotary mowers is provided, which has a mowing plate with a central drive region and an upper casing surface. The mowing plate is equipped with mower blades at its periphery. The mowing disc further includes a wear protection device consists of a single-component or multi-component protective cover which can be fastened on the upper casing surface.

20 Claims, 3 Drawing Sheets

(56) References Cited

U.S. PATENT DOCUMENTS

2015/0237798 A1* 8/2015 Lebeau .............. A01D 34/736
56/255
2017/0367257 A1 12/2017 Cmich et al.

FOREIGN PATENT DOCUMENTS

| DE | 2505679 A * | 8/1975 | ............ A01D 34/66 |
| DE | 2519378 A1 * | 11/1975 | ............ A01D 34/63 |
| DE | 2612381 A1 * | 11/1975 | ............ A01D 34/63 |
| DE | 2527266 A1 * | 1/1976 | ............ A01D 34/17 |
| DE | 3650290 T2 | 11/1995 | |
| DE | 19521067 A1 * | 12/1996 | ........... A01D 34/733 |
| DE | 19520618 C2 * | 9/1999 | ........... A01D 34/733 |
| EP | 0157453 A1 | 10/1985 | |
| EP | 219904 A * | 4/1987 | ........... A01D 34/664 |
| EP | 807374 A1 * | 11/1997 | ........... A01D 34/733 |
| EP | 1133910 A1 | 9/2001 | |
| EP | 1145615 A1 | 10/2001 | |
| EP | 1358786 A1 * | 11/2003 | ........... A01D 34/733 |
| EP | 1378588 A1 | 1/2004 | |
| EP | 1891851 A1 * | 2/2008 | ........... A01D 34/733 |
| EP | 2912935 A1 | 9/2015 | |
| EP | 3120683 A1 * | 1/2017 | ........... A01D 34/003 |
| FR | 2630289 B1 * | 11/1975 | ............ A01D 34/63 |
| FR | 2835393 A1 | 8/2003 | |
| GB | 1326900 A | 8/1973 | |
| GB | 211364 A * | 6/1983 | ........... A01D 34/733 |
| WO | 00/15022 A1 | 3/2000 | |
| WO | 0032017 A1 | 6/2000 | |

OTHER PUBLICATIONS

German Office Action dated Sep. 15, 2025 of Application No. 2217988531105.

* cited by examiner

WEAR PROTECTION DEVICE FOR MOWING DISCS FOR ROTARY MOWERS

CROSS-REFERENCE TO RELATED APPLICATIONS

The present disclosure claims priority from Austrian Patent Application A50517/2021, filed on Jun. 24, 2021, herein incorporated by reference in its entirety.

BACKGROUND

1. Field

The present disclosure relates to a wear protection device for mowing discs for rotary mowers, wherein each mowing disc comprises a mowing plate with a central drive region and an upper casing surface, and the mowing plate can be equipped with mower blades at its periphery. Additionally, the invention relates to a mowing disc.

2. Related Art

EP 1 378 588 B1 describes that the mowing plates of rotary mowers are exposed to high dynamic stress due to high rotational speeds, which cause local stress concentrations in the plate body. In order to be able to counteract these internal stress peaks by elastic deformation of the plate body, the mowing plates obtain, through heat treatment processes such as tempering, the necessary strength and toughness for an elastic deformation, but insufficient surface hardness and wear resistance. The problem of abrasive wear in the mowing plate in close proximity to the region of mounting of the mower blades but also in more distant regions is described in detail in EP 1 378 588 B1. The wall thickness reduction of the plate body resulting from abrasive wear leads, due to a reduction of the cross section, to a further increase in local stress and consequentially to cracks and breakages. In order to ensure the operational safety of rotary mowers, the whole mowing plate needs to be replaced whenever the wall thickness falls below a critical level or there are signs of cracking.

It is known to counteract the abrasive wear with wear protection layers, which are placed directly onto the surface of the heat-treated plate body through overlay welding or thermal spraying. The disadvantage of overlay welding are geometric indentations in the outlet regions of the welds as well as metallurgical indentations due to local hardening effects and coarse grain formation in the heat affected zones of the welding process, which reduces the elastic deformability of the mowing plate. Through thermal spraying without subsequent fusion bonding, the lack of tensile adhesive strength of the wear protection layer, which is only applied through mechanical clamping, leads to its flaking during the expected deformation of the mowing plate, whereas the inevitable heat input during subsequent fusion bonding of the sprayed layer causes annealing in the directly adjacent regions and consequently a loss in hardness and wear resistance of the pre-heat treated mowing plate.

EP 2 912 935 B1 shows a mowing plate for a rotary mower with a wear protection element that is screwed together with the bearing pin of the mower blade. This protects the screwing head of the bearing pin against wear through a U-shaped enclosing collar. Such removably mounted and therefore replaceable wear protection elements for the bearing pins of mower blades are also disclosed, for example, in EP 1 133 910 B1 as a bearing shield with an enclosing wall and an optional material guide element, or in EP 1 145 615 B1 as holding element with a surrounding ligament.

SUMMARY

On the basis of the above problems and disadvantages of the state of the art, it is an object of the invention to find a replaceable wear protection device for the mowing plates as well as for the bearing pins of the mower blade without impairing the mechanical properties of the plate body by geometric and metallurgical indentations or annealing. Additionally, the geometry of the mowing plate according to the state of the art should remain unchanged and it should not be necessary to remove the whole mowing plate when the wear protection device reaches the end of its working life.

The wear protection device is characterized, among other things, in that it is formed by a single-component or multi-component protective cover which can be fastened on the upper casing surface of the mowing plate. The protective cover may be fastened to the central drive region of the mowing plate, preferably removably fastened.

Preferably, the protective cover may be additionally fastened in the region of mounting of the mower blades on the mowing plate using bearing pins.

Optionally, the protective cover may be formed by at least two protective cover parts, each one extending from the central drive region towards the region of mounting of the mower blades and surrounding the end face of the mowing plate at the periphery with a downwardly beaded edge zone.

The protective cover may be constructed so that it follows the contour of the casing surface and is adjacent to it at least in some sections, wherein a recess for receiving and protecting the screwing head of the bearing pin of the mower blade is provided in the region of mounting of the mower blade.

Optionally, the surface of the protective cover is hardened and/or provided with one full-surface or multiple partial wear protection zones.

At least one material guide element projecting from the surface may be arranged on the surface of the protective cover.

Optionally, it is provided that the material guide element is screwed to the mowing plate using the bearing pin and surmounts the screwing head for protection.

The material guide element may have latching webs that latch into latching grooves of the protective cover.

Preferably, the protective cover is formed of steel.

The mowing disc is characterized in that it is provided with a wear protection device with the features disclosed herein.

Each protective cover part may be associated with a mower blade. However, each protective cover part may also be associated with multiple mower blades.

To achieve the object, it is suggested that the wear protection device is formed by a protective cover which can be fastened on the upper casing surface of the mowing plate. For this purpose, a single-component or multi-component protective cover is provided for removable mounting on the upper casing surface. The protective cover is fastened on the one hand in the central drive region of the mowing plate using the screws that also serve for frictional connection for transmitting the driving torque of the plate hub to the plate body and on the other hand in the peripheral region of mountings of the mower blades by screwing with the bearing pins of the mower blades.

With the present wear protection device, a mowing plate according to the state of the art can remain structurally unaltered and the material properties of the plate body ensuring its elastic deformability are not impaired. This results in an optimal wear protection of the mowing plate with fast assembly and replaceability of the protective cover and a reduction of maintenance costs.

In addition to the regions of the upper casing surface of the mowing plate, which are highly exposed to abrasion, the protective cover, with its downwardly beaded edge zone in the regions of mountings of the mower blades, also protects the vertical end surface, which is particularly exposed to wear around the circumference, by being placed over it in the shape of a hood.

The protective cover has a pot-shaped recess in the region of mounting of the mower blades for protecting the screwing head of the bearing pin against mechanical effects brought about by foreign matter and wear caused by the abrasive mowed material, thanks to its recessed position with respect to the surrounding upper casing surface of the protective cover. Optionally, a material guide element may be positioned on the upper casing surface of the protective cover through form-fit means such as ligaments on the material guide element and cavities in the protective cover, and fastened with the bearing pin of the mower blades. The material guide element also has a pot-shaped recess in the region of the bearing pin, in order to protect the screwing head against wear due to its recessed position.

Since the protective cover, due to its frictional connection with the mowing plate, is subjected to lower dynamic stress compared to the mowing plate itself and does not have a supporting function for the mower blades, it can be made particularly wear resistant through a targeted material selection and special heat treatment processes, and preferably provided with partial wear protection zones on the upper casing surface. The partial wear protection zones, which can be significantly more wear resistant compared to the main body of the protective cover, are made, for example, by coating or subsurface alloying methods. Advantageously, the heat treatment process of the protective cover takes place after the production of the wear protection zones, in order to avoid a potential loss of hardness of the main body in the heat affected zones. The optional material guide element, due to its guiding and conveying functions for the abrasive mowed material, is also subject to a significant wear exposure, and can therefore be also made particularly wear resistant using the same heat treatment processes used for the protective cover and the wear protection zones.

BRIEF DESCRIPTION OF THE DRAWINGS

In the following, the invention is described by way of example with reference to exemplary embodiments according to the figures.

DETAILED DESCRIPTION OF THE PREFERRED EMBODIMENTS

Figure 1:
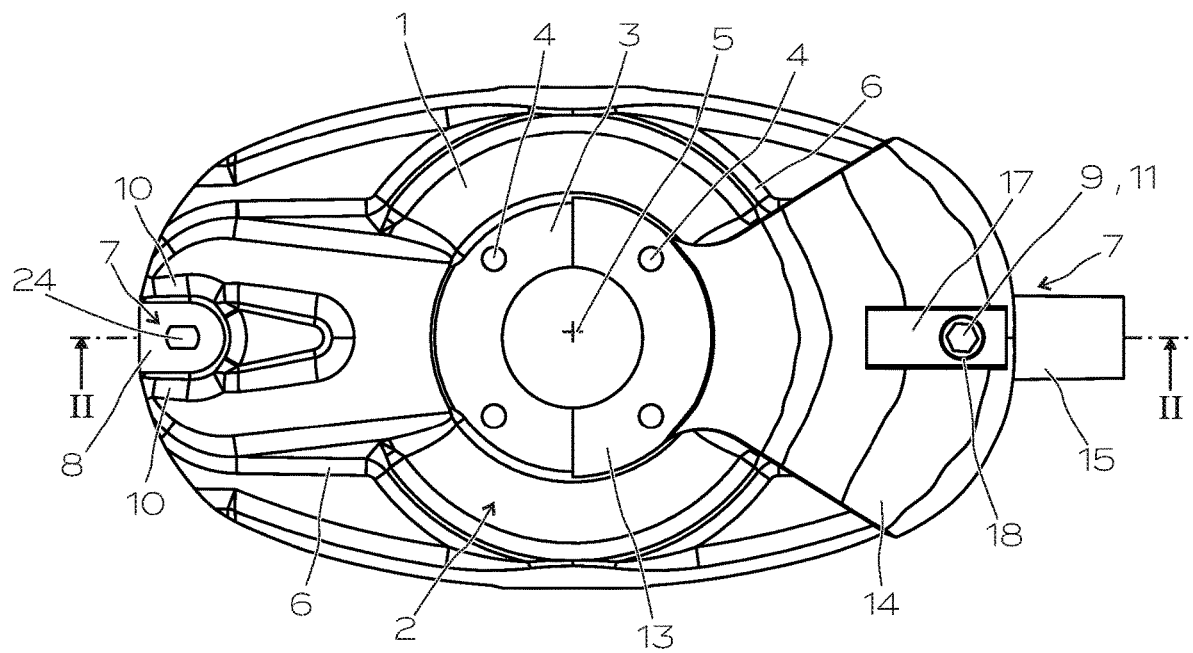
FIG. 1 shows a plan view of a first example of a mowing disc, wherein a protective cover part according to the invention is screwed on the right half.

The mowing disc according to FIG. 1 has an elongated shape in this embodiment, wherein the longitudinal extension in the direction of the section line II-II is longer than the transversal one. FIG. 1 shows the completely mounted state on the right half, whereas the left half is only partially mounted.

The mowing disc comprises the mowing plate 1, the surface of which is referred to as upper casing surface 2. The central drive region 3 of the mowing plate 1 is attached to the plate hub (not shown here), wherein the connection is made with screws through the screw holes 4. For the mowing operation, the mowing disc is set into fast rotation about the rotation axis 5. The mowing plate 1 is preferably pressed of sheet steel. Through presser edges 6, an increased strength of the mowing plate 1 and its downwardly open bowl shape are obtained. In the region of mounting 7 of the mower blades 15, the mowing plate 1 has a recess 8 for receiving and protecting the screwing head 11 of the bearing pin 9, which is received in the opening 24. The protection of the bearing pin 9 and in particular of its screwing head 11 is provided by the remaining projections 10 of the recess 8.

Figure 2:
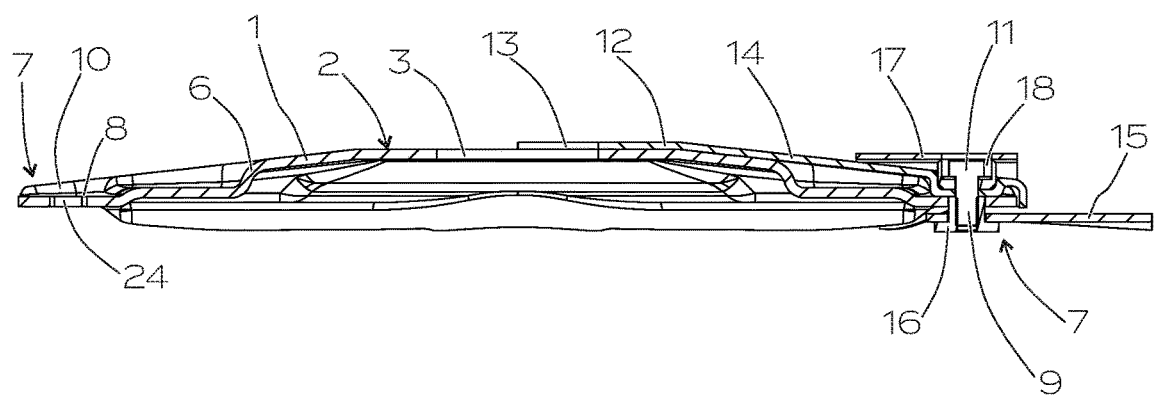
FIG. 2 shows a section along line II-II in FIG. 1.

The protective cover 12 provided according to the invention is arranged in the right part of the mowing disc and fastened with its fastening region 13 to the central drive region 3 of the mowing plate 1, preferably removably fastened by means of screws. FIGS. 1 and 2 show respectively a protective cover part 12 on the right. After the assembling of the mowing disc, the protective cover 12 is completed with a same-looking part of the protective cover 12 on the left side.

The protective cover 12 substantially follows the contour of the upper casing surface 2 and is adjacent to it at least in some sections. In the region of mounting 7 of the mower blades 15, the bearing pin 9 may be directly arranged on the mowing plate 1 for screwing the mower blades 15, wherein a bearing sleeve 16 is provided for ensuring the slight pivotability of the mower blade 15. As a result, both mower blades 15 are not rigidly connected to the mowing plate 1, but are pressed outwards by the centrifugal forces.

The material guide element 17 shown in FIGS. 1 and 2 may have an additional guiding and conveying function for the mowed material, although that is only an optional embodiment variant. FIG. 2 shows this arrangement with a material guide element 17 in the right section, this material guide element 17 also having a pot-shaped recess 18 for receiving and laterally protecting the screwing head 11 of the bearing pin 9. The mounting 7 of the mower blades 15 without material guide element 17 is analogous to the form shown in the right section of FIGS. 1 and 2, wherein, since the material guide element 17 is not present, the bearing pin 9 can be slightly shorter.

Figure 3:
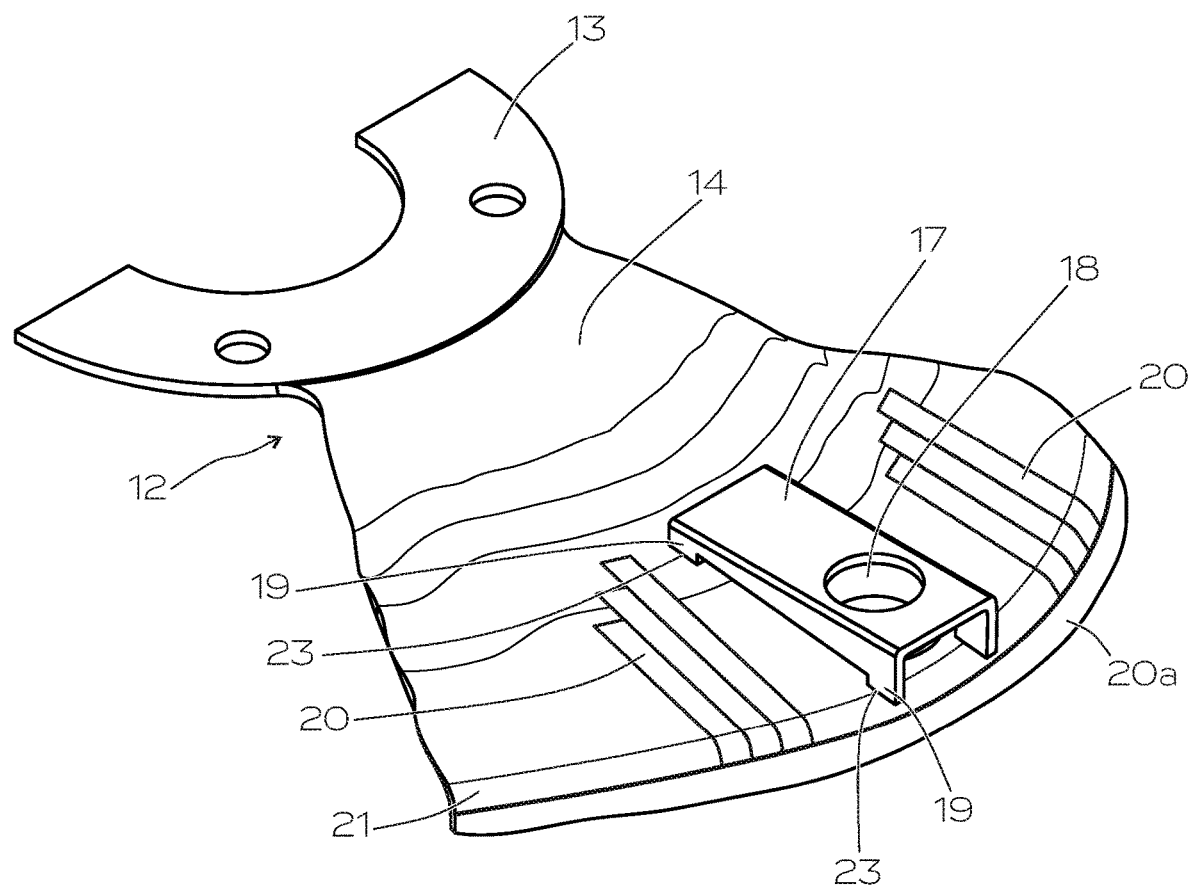
FIG. 3 shows the diagonal view of the protective cover part according to FIG. 1 or 2.

FIG. 3 shows one of the protective cover parts 12 in a diagonal view, the material guide element 17 being attached to it in the protective region 14. The material guide element 17 is screwed to the mowing plate 1 using the bearing pin 9 (not shown here), wherein the screwing head 11 is protected by the upwardly projecting sections of the pot-shaped recess 18. A form-fitting connection between the material guide element 17 and the protective cover 12 is achieved in that the material guide element 17 has downwardly directed latching webs 19 which latch into latching grooves 23, which are aligned with the latching webs 19, of the protective region 14 of the protective cover 12.

The surface of the protective region 14 of the protective cover 12 is preferably hardened and/or may be provided with one full-surface or, according to FIG. 3, with multiple partial wear protection zones 20. The position and design of the wear protection zones 20 can be adapted to the respective wear exposure. In particular, the downwardly beaded edge zone 21 in the protective region 14 of the protective cover 12, which is highly exposed to wear, may be protected against wear with an even more wear resistant partial wear protection zone 20a. The impairment of the material properties of the protective cover 12, which may occur due to the production of the wear protection zones 20, can be ignored, since the high tensile and impact forces of the mower blades 15 are only to be absorbed by the mowing plate 1, whereas the protective cover 12 is not affected by these forces.

Figure 4:
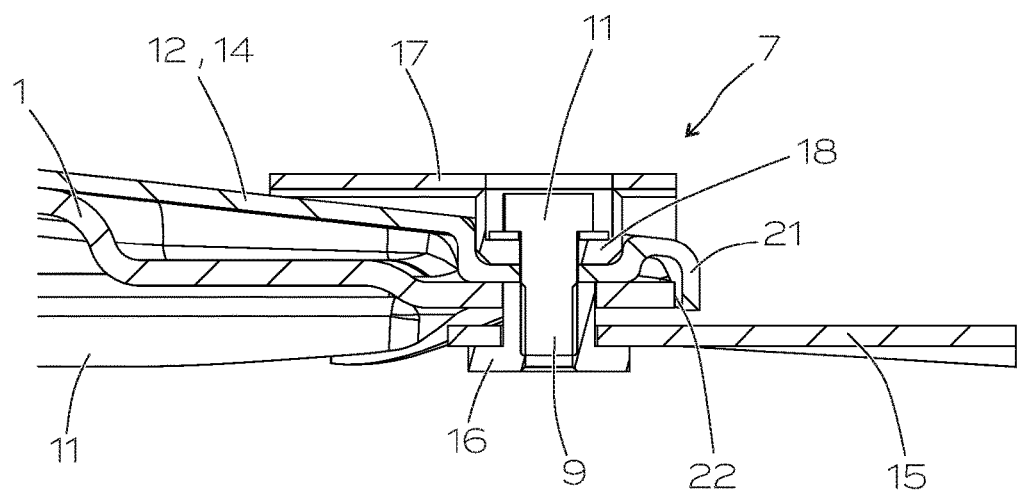
FIG. 4 is an enlarged view of the right edge region of the mowing disc in FIG. 2.

FIG. 4 is a slightly enlarged view of the region of mounting 7 of the mower blades 15 having the material guide element 17 arranged. In the protective region 14, the protective cover 12 has a downwardly beaded edge zone 21 which surrounds the end face 22 of the mowing plate 1.

Figure 5:
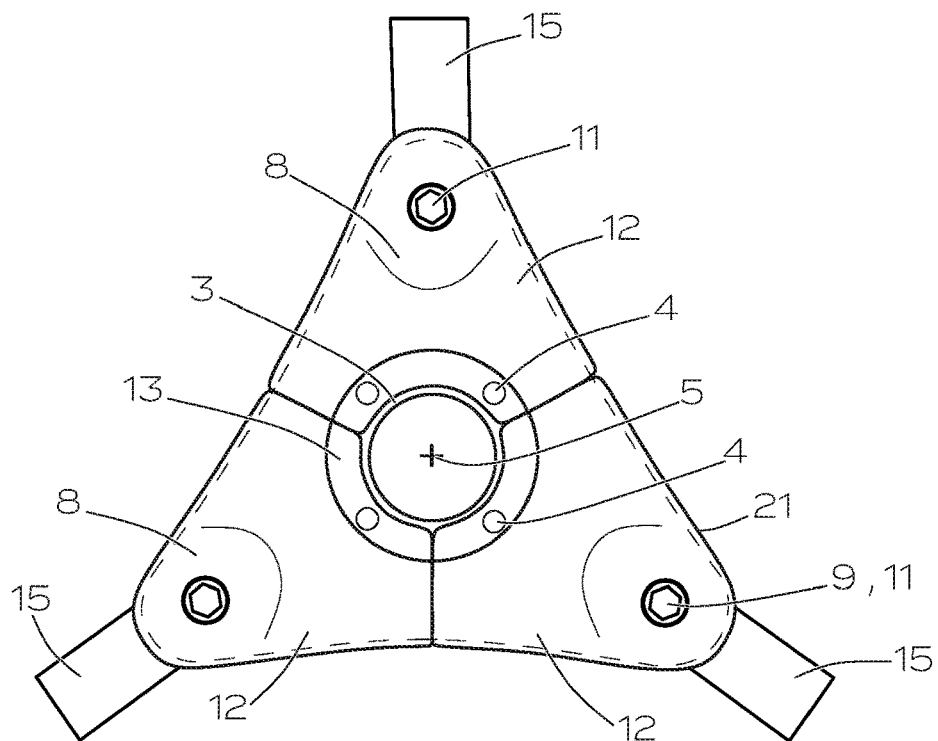
FIGS. 5 and 6 show two alternative embodiments of the mowing discs according to the invention.

FIG. 5 schematically shows the plan view of a mowing disc in a triangular shape with three mower blades 15 and three associated protective cover parts 12. The design of the protective cover parts 12 and their fastening to the mowing plate 1 are similar to the design according to FIGS. 1 to 4. Each protective cover part 12 is attached to the central drive region 3 of the mowing plate 1 both by its own bearing pin 9 and by screwing in the fastening region 13 through the screw holes 4.

Similar to the previous exemplary embodiments, material guide elements 17 may also be arranged in the region of mounting 7 of the mower blades 15. Furthermore, this triangular embodiment of the mowing disc with respective wear protection zones 20 may be provided as shown in FIG. 3. The position of the wear protection zones 20 obviously needs to be adapted to the wear exposure of the mowing disc.

Figure 6:
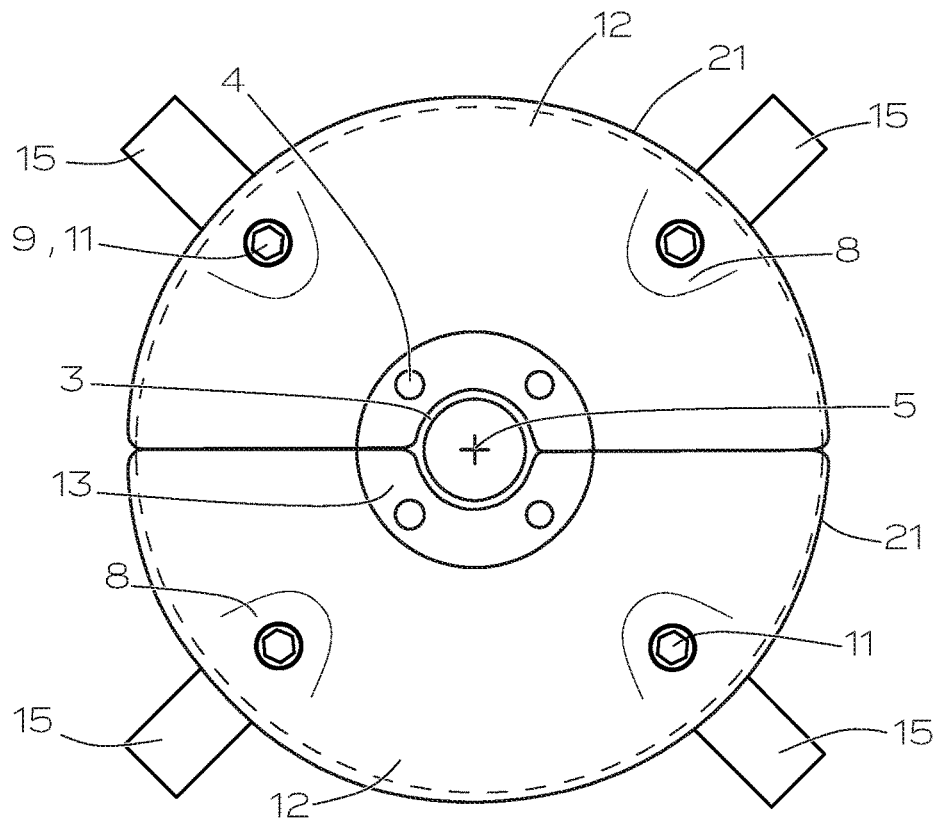

FIG. 6 shows an exemplary embodiment for a circular mowing disc, wherein each protective cover part 12 is attached to the central drive region 3 of the mowing plate 1 with the bearing pin 9 of two mower blades 15 and, additionally, by screwing through the screw holes 4.

In the embodiments shown in FIGS. 5 and 6 it is also possible to fit given mowing discs with the protective covers 12 during initial assembly or retrofit them, in order to make them more wear resistant. The protective cover parts 12 can also be replaced without a lot of disassembling work.

FIGS. 5 and 6 show that the wear protection device can be adapted to any shape of the mowing discs.

There have been described and illustrated herein several embodiments of a mowing disc for a rotary mower a method of manufacturing the same. While particular embodiments of the invention have been described, it is not intended that the invention be limited thereto, as it is intended that the invention be as broad in scope as the art will allow and that the specification be read likewise. It will therefore be appreciated by those skilled in the art that modifications could be made to the provided invention without deviating from its spirit and scope as claimed.

LIST OF REFERENCE SIGNS

1 Mowing plate
2 Upper casing surface
3 Central drive region
4 Screw hole
5 Rotation axis
6 Presser edge
7 Mounting
8 Recess
9 Bearing pin
10 Projection
11 Screwing head
12 Protective cover or protective cover part
13 Fastening region
14 Protective region
15 Mower blade
16 Bearing sleeve
17 Material guide element
18 Pot-shaped recess
19 Latching web
20, 20a Wear protection zone
21 Edge zone
22 End face
23 Latching groove
24 Opening

What is claimed is:

1. A wear protection device for use with a mowing plate for a rotary mower, wherein the mowing plate has a central drive portion, a peripheral portion, and a casing surface extending between the central drive portion and the peripheral portion, wherein the peripheral portion includes a plurality of recesses configured to receive bearing pins for mounting a plurality of mower blades to the mowing plate, CHARACTERIZED IN THAT the wear protection device comprises:
at least one part configured to cover the central drive portion, the casing surface, and the peripheral portion of the mowing plate, wherein the at least one part is configured to attach to the central drive portion of mowing plate, and wherein the at least one part is further configured to attach to the peripheral portion of the mowing plate in an area around the plurality of recesses by means of the bearing pins.

2. The wear protection device according to claim 1, wherein:
the at least one part is configured to follow at least a portion of the contour of the casing surface of the mowing plate.

3. The wear protection device according to claim 1, wherein:
the at least one part is removably fastened to the central drive portion of the mowing plate of the mowing plate.

4. The wear protection device according to claim 1, wherein:
the at least one part includes a plurality of holes configured to removably fasten the at least one part to the central drive portion of the mowing plate.

5. The wear protection device according to claim 1, wherein:
the at least one part comprises at least two parts, each configured to extend from the central drive portion of the mowing plate in a direction toward the peripheral portion of the mowing plate, wherein the at least two parts correspond to different mower blades of the plurality of mower blades.

6. The wear protection device according to claim 1, wherein:
the at least one part has a surface that is hardened and/or provided with at least one wear protection zone.

7. The wear protection device according to claim 1, further comprising:
a guide element configured to project from and cover the at least one part in the area around a corresponding recess of the peripheral portion of the mowing plate, wherein the guide element is configured to attach to the at least one part and the mowing plate by means of a corresponding bearing pin.

8. The wear protection device according to claim 7, wherein:
   the at least one part has a protective cover recess that extends toward one of the plurality of recesses of the peripheral portion of the mowing plate, wherein the protective cover recess is configured to receive one bearing pin of the plurality of bearing pins, and wherein the guide element has a pot-shaped recess that is operably disposed within the protective cover recess and configured to receive the one bearing pin and surround and protect a screw head of the one bearing pin.

9. The wear protection device according to claim 7, wherein:
   the material guide element has latching webs which latch into latching grooves of the at least one part.

10. The wear protection device according to claim 1, wherein:
    the at least one part is formed of steel.

11. The wear protection device according to claim 1, wherein:
    the peripheral portion of the mowing plate has a front surface, and the at least one part of the protective cover has a downwardly flanged edge that covers the front surface of the peripheral portion of the mowing plate.

12. The wear protection device according to claim 1, wherein:
    the at least one part is configured to cover the central drive portion, the casing surface, and the peripheral portion of the mowing plate on a first side of the mowing plate opposite the plurality of mowing blades, wherein the at least one part is further configured to attach to the central drive portion on the first side of mowing plate, and wherein the at least one part is further configured to attach to the peripheral portion of the mowing plate on the first side of the mowing plate.

13. An assembly for a rotary mower, comprising:
    a mowing plate having a central drive portion, a peripheral portion, and a casing surface extending between the central drive portion and the peripheral portion, wherein the peripheral portion includes a plurality of recesses configured to receive bearing pins for mounting a plurality of mower blades to the mowing plate; and
    a wear protection device comprising at least one part configured to cover the central drive portion, the casing surface, and the peripheral portion of the mowing plate, wherein the at least one part is configured to attach to the central drive portion of mowing plate, and wherein the at least one part is further configured to attach to the peripheral portion of the mowing plate in an area around the plurality of recesses by means of the bearing pins.

14. The assembly according to claim 13, wherein:
    the at least one part is configured to follow at least a portion of the contour of the casing surface.

15. The assembly according to claim 13, wherein:
    the at least one part is removably fastened to the central drive portion of the mowing plate.

16. The assembly according to claim 13, wherein:
    the at least one part includes a plurality of holes configured to removably fasten the at least one part to the central drive portion of the mowing plate.

17. The assembly according to claim 13, wherein:
    the at least one part comprises at least two parts, each configured to extend from the central drive portion of the mowing plate in a direction toward the peripheral portion of the mowing plate, wherein the at least two parts correspond to different mower blades of the plurality of mower blades.

18. The assembly according to claim 13, wherein:
    the at least one part has a surface that is hardened and/or provided with at least one wear protection zone.

19. The assembly according to claim 13, wherein:
    the wear protection device further comprises a guide element configured to project from and cover the at least one part in the area around a corresponding recess of the peripheral portion of the mowing plate, wherein the guide element is configured to attach to the mowing plate by means of a corresponding bearing pin.

20. The assembly according to claim 13, wherein:
    the at least one part has a protective cover recess that extends toward one of the plurality of recesses of the peripheral portion of the mowing plate, wherein the protective cover recess is configured to receive one bearing pin of the plurality of bearing pins, and wherein the guide element has a pot-shaped recess that is operably disposed within the protective cover recess and configured to receive the one bearing pin and surround and protect a screw head of the one bearing pin; and/or
    the material guide element has latching webs which latch into latching grooves of the at least one part.

* * * * *